(12) United States Patent
Chang et al.

(10) Patent No.: US 11,543,656 B2
(45) Date of Patent: Jan. 3, 2023

(54) WINDSHIELD FOR ELIMINATING GHOST IMAGES OF A HEAD UP DISPLAY SYSTEM

(71) Applicant: GM GLOBAL TECHNOLOGY OPERATIONS LLC, Detroit, MI (US)

(72) Inventors: Kai-Han Chang, Madison Heights, MI (US); Thomas A. Seder, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 559 days.

(21) Appl. No.: 16/531,844

(22) Filed: Aug. 5, 2019

(65) Prior Publication Data

US 2021/0041694 A1 Feb. 11, 2021

(51) Int. Cl.
| | |
|---|---|
| *G02B 27/01* | (2006.01) |
| *G02B 27/00* | (2006.01) |
| *B32B 17/10* | (2006.01) |
| *B32B 27/30* | (2006.01) |
| *B60J 1/00* | (2006.01) |
| *B60J 1/02* | (2006.01) |
| *G02B 5/22* | (2006.01) |
| *B60K 35/00* | (2006.01) |

(52) U.S. Cl.
CPC .... *G02B 27/0101* (2013.01); *B32B 17/10036* (2013.01); *B32B 17/10431* (2013.01); *B32B 17/10761* (2013.01); *B32B 27/306* (2013.01); *B60J 1/001* (2013.01); *B60J 1/02* (2013.01); *G02B 5/223* (2013.01); *G02B 27/0018* (2013.01); *B32B 2250/03* (2013.01); *B32B 2250/40* (2013.01); *B32B 2605/006* (2013.01); *B60K 35/00* (2013.01); *B60K 2370/1529* (2019.05); *B60K 2370/167* (2019.05); *G02B 2027/012* (2013.01)

(58) Field of Classification Search
CPC ....... G02B 5/223; G02B 27/00–27/648; B32B 17/00–17/1099
See application file for complete search history.

(56) References Cited

U.S. PATENT DOCUMENTS

| | | | | |
|---|---|---|---|---|
| 2015/0352814 | A1* | 12/2015 | Keller | B32B 17/10036 428/437 |
| 2017/0235030 | A1* | 8/2017 | Tanaka | G02B 27/0101 349/11 |
| 2020/0009837 | A1* | 1/2020 | Yoshida | B32B 17/1011 |

FOREIGN PATENT DOCUMENTS

| | | | | |
|---|---|---|---|---|
| WO | WO-2016135288 A1 * | 9/2016 | | B60J 1/001 |
| WO | WO-2017223023 A1 * | 12/2017 | | B32B 17/00 |
| WO | WO-2018182029 A1 * | 10/2018 | | B32B 17/04 |

OTHER PUBLICATIONS

"DyeBrite Fluorescent Dyes for Plastics: Technical Brochure". Day-Glo Color Corp., Retrieved Feb. 8, 2022.*

(Continued)

*Primary Examiner* — Prashant J Khatri
(74) *Attorney, Agent, or Firm* — Harness, Dickey & Pierce, P.L.C.

(57) ABSTRACT

A substrate, such as a windshield, includes: a first glass element; a second glass element; and a light absorptive element that is disposed directly between the second glass element and the first glass element, that is configured to receive and absorb light output by an image source.

13 Claims, 8 Drawing Sheets

(56) References Cited

OTHER PUBLICATIONS

Dobrowolski, J.A. (eds. Bass et al.). "Chapter 42: Optical Properties of Films and Coatings", Handbook of Optics, vol. I: Fundamentals, Techniques, and Design, 2nd ed., (1995); pp. 42.1-42.130.*
U.S. Appl. No. 16/363,536, filed Mar. 25, 2019, Chang et al.
U.S. Appl. No. 16/373,056, filed Apr. 2, 2019, Chang et al.
U.S. Appl. No. 16/379,439, filed Apr. 9, 2019, Chang et al.
U.S. Appl. No. 16/418,574, filed May 21, 2019, Chang et al.

* cited by examiner

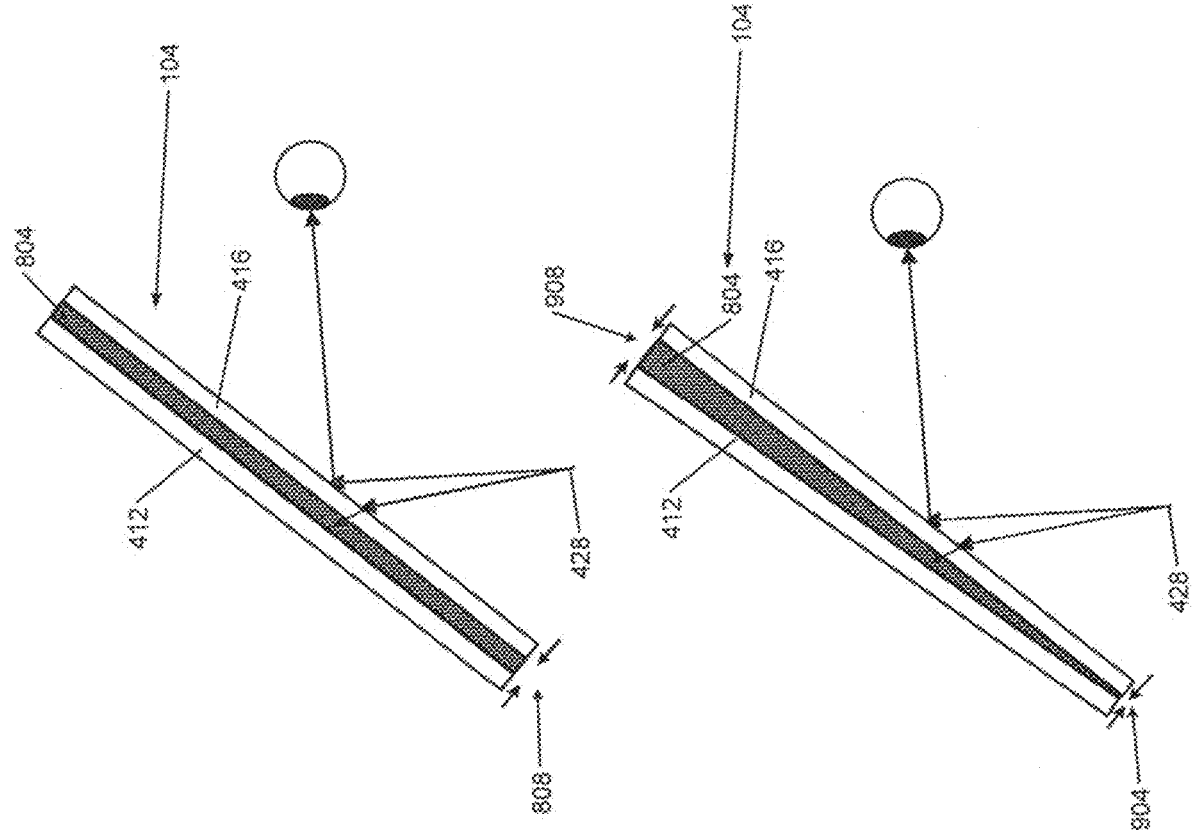

WINDSHIELD FOR ELIMINATING GHOST IMAGES OF A HEAD UP DISPLAY SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for reducing ghost images due to multiple reflections and more particularly to reducing ghost images in head up display systems of vehicles.

A driver of a vehicle traditionally views surroundings of a vehicle through windows, wind shields, and other glass of the vehicle. The driver may control vehicle acceleration, deceleration, and steering based on the driver's visual observation of the surroundings of the vehicle.

A vehicle may include one or more displays that display various information. For example, some vehicles include an infotainment system that includes a display that displays various infotainment and other vehicle information. A vehicle may also include a head up display (HUD) that displays information on a windshield of the vehicle. For example, the HUD may display a vehicle speed and other vehicle information.

SUMMARY

In a feature, a substrate includes: a first glass element; a second glass element; and a light absorptive element that is disposed directly between the second glass element and the first glass element, that is configured to receive and absorb light output by an image source.

In further features: the image source is configured to output light within a predetermined wavelength range; and the light absorptive element includes at least one light absorptive dye having a transmittance of less than a predetermined transmittance throughout the predetermined wavelength range.

In further features the predetermined transmittance is less than 15 percent.

In further features: the image source is configured to output red light within a predetermined red wavelength range; and the light absorptive element includes at least one light absorptive dye having a transmittance of less than a predetermined transmittance throughout the predetermined red wavelength range.

In further features: the image source is configured to output green light within a predetermined green wavelength range; and the light absorptive element includes at least one light absorptive dye having a transmittance of less than a predetermined transmittance throughout the predetermined green wavelength range.

In further features: the image source is configured to output blue light within a predetermined blue wavelength range; and the light absorptive element includes at least one light absorptive dye having a transmittance of less than a predetermined transmittance throughout the predetermined blue wavelength range.

In further features: the image source is configured to output: red light within a predetermined red wavelength range; green light within a predetermined green wavelength range; and blue light within a predetermined blue wavelength range; and the light absorptive element includes: a red light absorptive dye having a first transmittance of less than a predetermined transmittance throughout the predetermined red wavelength range; a green light absorptive dye having a second transmittance of less than the predetermined transmittance throughout the predetermined green wavelength range; and a blue light absorptive dye having a third transmittance of less than the predetermined transmittance throughout the predetermined blue wavelength range.

In further features the predetermined transmittance is less than 15 percent.

In further features: the red light absorptive dye has a fourth transmittance that is greater than the predetermined transmittance outside of the predetermined red wavelength range; the green light absorptive dye has a fifth transmittance that is greater than the predetermined transmittance outside of the predetermined green wavelength range; and the blue light absorptive dye has a sixth transmittance that is greater than the predetermined transmittance outside of the predetermined blue wavelength range.

In further features the light absorptive element includes polyvinyl butyral (PVB) resin mixed with two or more light absorptive dyes configured to absorb different wavelengths of the light output by the image source.

In further features the light absorptive element has a uniform thickness.

In further features: a first portion of the light absorptive element has a first thickness between first and second glass elements; and a second portion of the light absorptive element has a second thickness between the first and second glass elements; and the first thickness is less than the second thickness.

In a feature, a head up display (HUD) system of a vehicle includes: the substrate, where the substrate is a windshield; and the image source.

In further features a reflector is configured to reflect the light output by the image source onto the windshield.

In further features a HUD control module is configured to generate signals based on vehicle data, where the vehicle data includes at least one present operating parameter of the vehicle, and where the image source is configured to output light based on the signals.

In a feature, a substrate includes: a first glass element; a second glass element having a first refractive index; a polyvinyl butyral (PVB) element disposed between the first glass element and the second glass element and directly contacting the first glass element; and a total internal refraction (TIR) element that is disposed between the first glass element and the second glass element, that is configured to receive light output by an image source, and that has a second refractive index, where the second refractive index is less than the first refractive index.

In further features the TIR element and the second glass element are configured to reflect the light received by the TIR element back and forth between the TIR element and the second glass element.

In further features the TIR element includes an aerogel.

In further features the TIR element is disposed within the PVB element.

In a feature, a windshield of a vehicle includes: an outer glass element configured to face an exterior of the vehicle; an inner glass element configured to face a passenger cabin of the vehicle; and a light absorptive element that is disposed directly between the outer glass element and the inner glass element, that is configured to receive light output by an image source of a head up display (HUD) system, and that includes: polyvinyl butyral (PVB); and at least one light absorptive dye configured to absorb the light output by the image source.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 8-10 include cross-sectional views of an example implementation of a windshield that minimizes or prevents ghost image production;

In the drawings, reference numbers may be reused to identify similar and/or identical elements.

DETAILED DESCRIPTION

A vehicle may also include a head up display (HUD) that displays a virtual image at a distance in front of a driver by reflecting the image off the windshield of the vehicle.

The windshield may include an outer glass layer, an inner glass layer, and a polyvinyl butyral (PVB) layer that is used to laminate the inner and outer glass layers to one another. The PVB layer may have a uniform thickness. If the PVB layer has a uniform thickness, however, a viewer of the HUD system may see both the virtual image intended to be produced by the HUD system and a ghost image. In various implementations, the PVB layer may have a variable thickness to recombine the primary and ghost image at the driver's eyes.

The present application involves minimizing or preventing ghost image generation. For example, the PVB layer may include one or more narrow band absorptive dyes that absorb wavelengths of light output by an image source and that transmit other visible wavelengths, such as light from outside of the vehicle. The PVB layer may include, for example, a red light absorptive dye that absorbs red light output by the image source, a blue light absorptive dye that absorbs blue image output by the image source, and a green light absorptive dye that absorbs green light output by the image source. The light absorptive dye(s) may minimize or prevent ghost image generation.

Alternatively, the windshield may include a total internal reflection layer (TIR) that has a refractive index that is less than the refractive index of the inner glass layer. The TIR layer is configured to create a TIR condition where light from the image source that is transmitted to the TIR layer through the inner glass layer is not reflected back through the outer glass layer. Instead, the TIR layer and the inner glass layer reflect the light back and forth between the TIR layer and the inner glass layer. In various implementations, the TIR layer may have a variable thickness. The TIR condition may minimize or prevent ghost image production.

Figure 1:
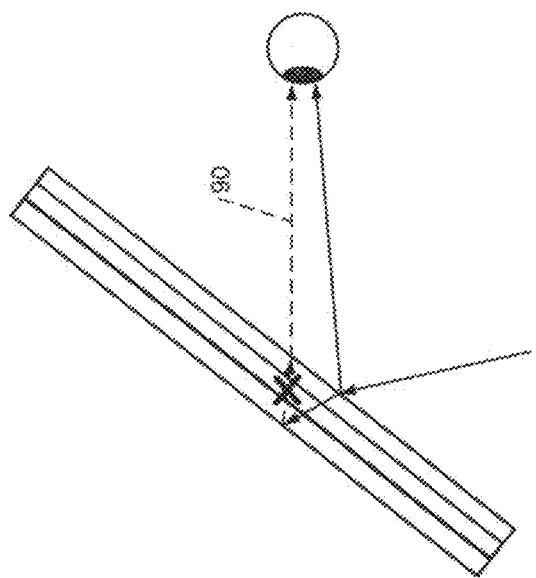
FIG. 1 is an example illustration of two index matched laminated substrates with a laminate that eliminates additional reflections.

FIG. 1 is an illustration of eliminating ghost images 90 induced by multiple reflections from a substrate. The illustrated example includes a windshield with uniform thickness of interlayer polyvinyl butyral (PVB).

Figure 2:
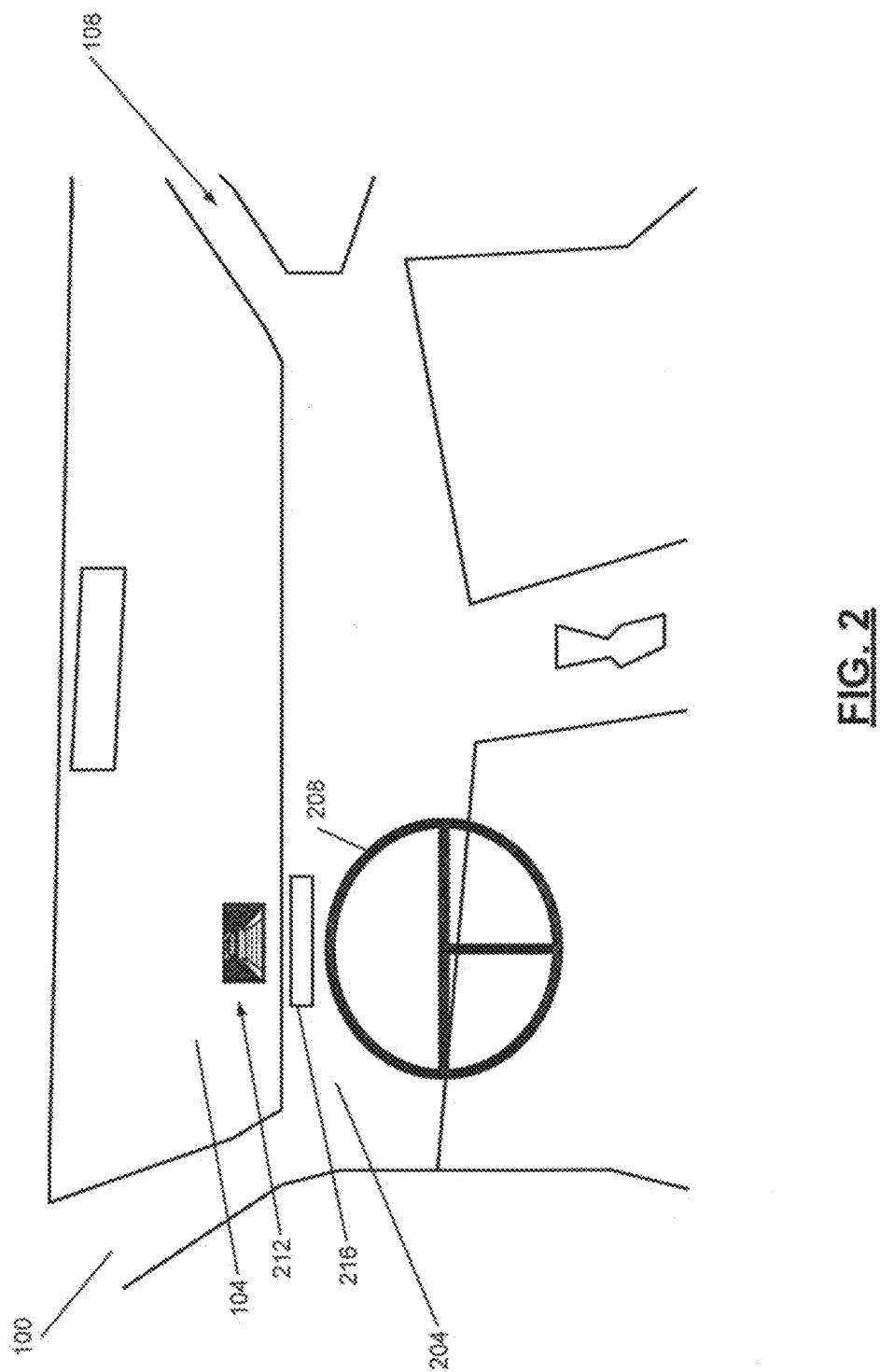
FIG. 2 is an example perspective view from of a driver seat within a passenger cabin of a vehicle.

FIG. 2 includes an example perspective view from a driver seat of a vehicle 100. The vehicle 100 includes a windshield 104 located in a front opening of the vehicle 100. Passengers within a passenger cabin 108 of the vehicle 100 can look through the windshield 104 to see in front of the vehicle 100. While the example of a land-based vehicle is described, the present application is also applicable to air-based vehicles (e.g., airplanes, helicopters, etc.) and water-based vehicles (e.g., boats, etc.). Also, while the example of a vehicle is provided, the present application is also applicable to non-vehicle implementations.

As shown in FIG. 2, the windshield 104 is visually located above a dashboard 204 of the vehicle 100. The vehicle 100 may include a steering wheel 208. The vehicle 100 may be an autonomous vehicle, a semi-autonomous vehicle, or a non-autonomous vehicle.

Figure 3:
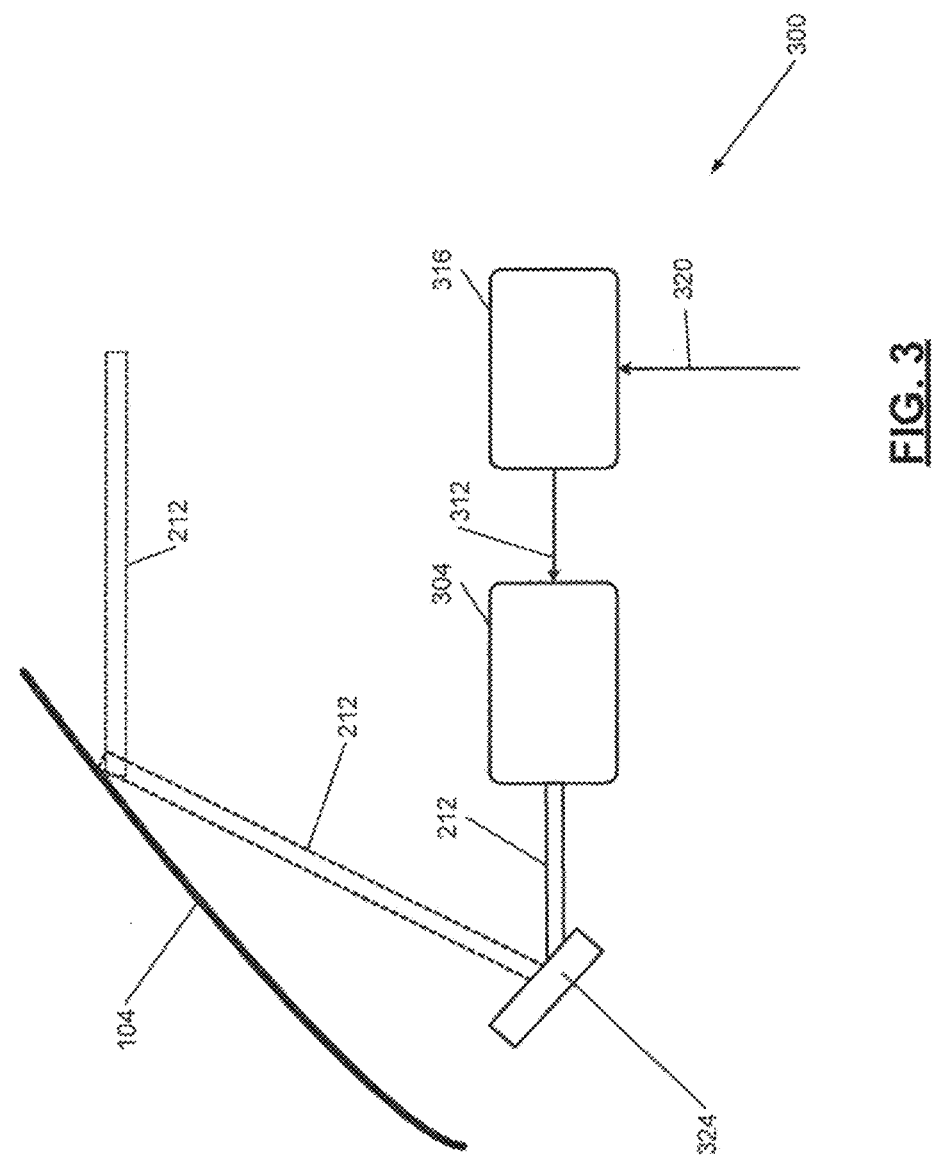
FIG. 3 includes a functional block diagram of an example implementation of a head up display (HUD) system.

FIG. 3 includes an example implementation of a head up display (HUD) system 300. Referring to FIGS. 2 and 3, the HUD 300 projects an image 212 (a virtual image) onto a portion of the windshield 104 through an aperture 216 in the dashboard 204. The image 212 includes various vehicle information, such as a present speed of the vehicle 100, a present gear of a transmission of the vehicle 100, an engine speed, a directional heading of the vehicle 100, present infotainment system settings, and/or other vehicle information. The image 212 presents data to the driver of the vehicle without the driver having to look away from objects in front of the vehicle.

An image source 304 outputs (projects) the image 212 based on signals 312 from a HUD control module 316. For example only, the image source 304 may include one or more lasers and output red, green, and blue light. The HUD control module 316 generates the signals 312 based on vehicle data 320.

The HUD control module 316 may obtain the vehicle data 320, for example, from a communication bus of the vehicle 100. The vehicle data 320 may include, for example, the present speed of the vehicle 100, the present gear of the transmission of the vehicle 100, the present engine speed, the present directional heading of the vehicle 100, the present infotainment system settings, and/or the other vehicle information.

A reflector 324 reflects the image 212 onto the windshield 104 through the aperture 216. A viewer can view the image 212 in the area where the image 212 is projected onto the windshield 104. In various implementations, the reflector 324 may be omitted, and the image source 304 may project the image 212 directly onto the windshield 104.

Figure 4:
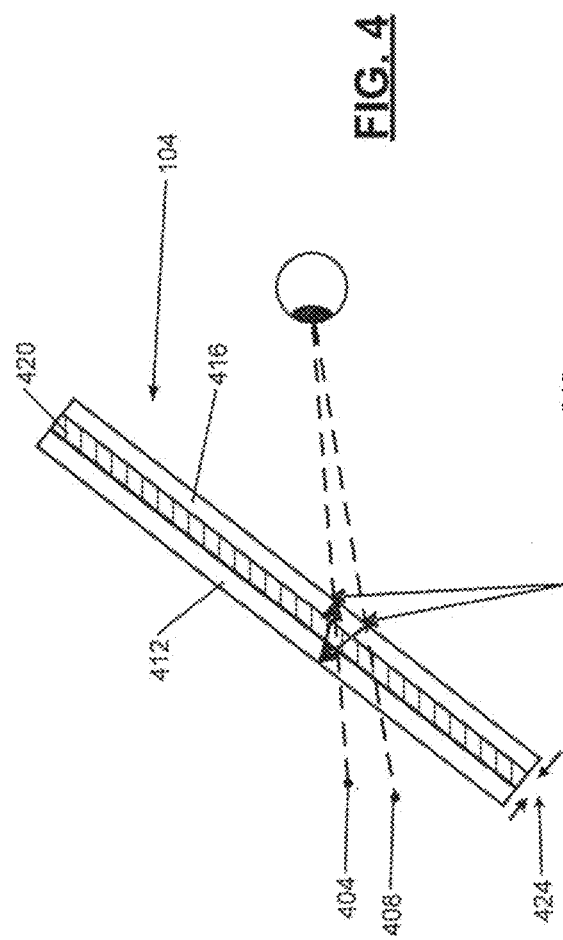
FIG. 4 includes a cross-sectional view of an example implementation of a windshield.

FIG. 4 includes a cross-sectional view of an example implementation of the windshield 104 that produces a ghost image 404 on the windshield 104 vertically above a virtual image 408 produced by the HUD system 300.

In the example of FIG. 4, the windshield 104 includes a first (outer) glass element 412, a second (inner) glass element 416, and a polyvinyl butyral (PVB) element (e.g., layer) 420. In this example, the PVB element 420 has a uniform thickness 424. The first glass element 412 faces an exterior of the vehicle 100. The second glass element 416 faces the passenger cabin 108 of the vehicle 100.

Light 428 from the reflector 324 creates the virtual image 408. Some of the light 428, however, travels through the second glass element 416 and the PVB element 420 toward the first glass element 412. The first glass element 412 reflects some of the received light back toward the second glass element 416, thereby creating the ghost image 404 vertically above the virtual image 404.

Figure 5:
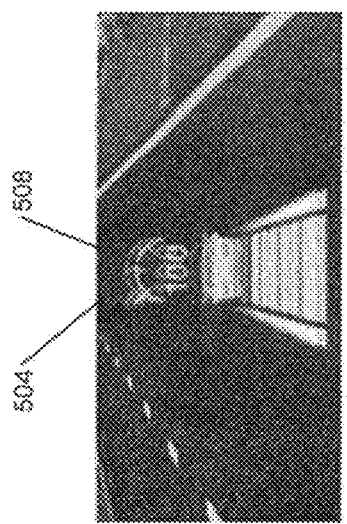
FIG. 5 includes an example illustration of including an example ghost image and an example virtual image.

FIG. 5 includes an example illustration of including an example ghost image 504 and an example virtual image 508. As shown in FIG. 5, the ghost image 504 is a copy of the virtual image 508, but is less intense than the virtual image 508 and is visually above the virtual image 508.

Figure 6:
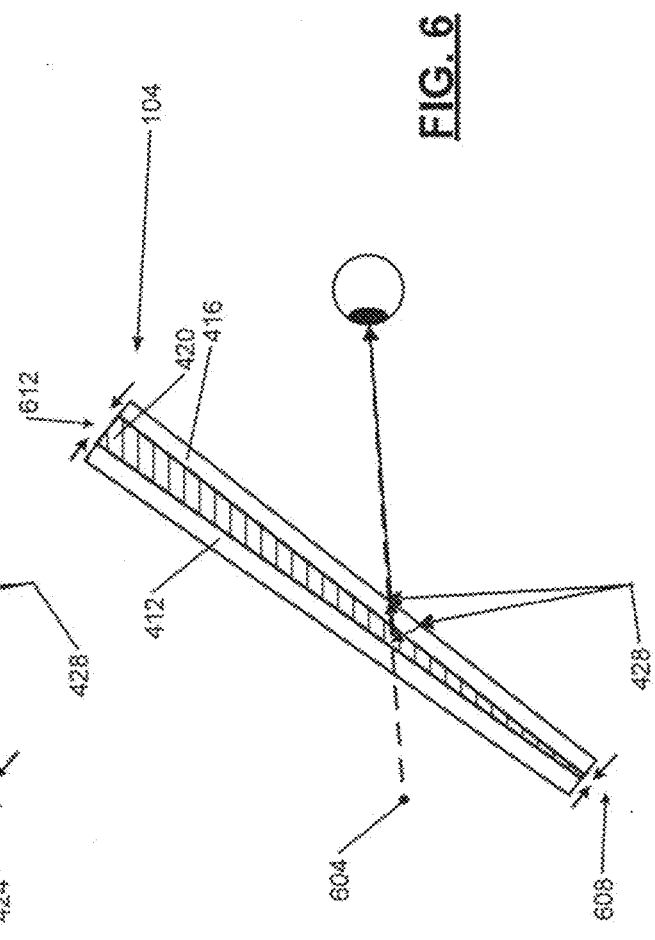
FIG. 6 includes a cross-sectional view of an example implementation of the windshield that produces a combination ghost/virtual image.

FIG. 6 includes a cross-sectional view of an example implementation of the windshield 104 that produces a combination ghost/virtual image 604. The combination ghost/virtual image 604 includes both a ghost image and a virtual image. The ghost image and the virtual image, however, are vertically aligned in this example.

In the example of FIG. 6, the windshield 104 includes the first (outer) glass element 412, the second (inner) glass element 416, and the polyvinyl butyral (PVB) element 420. In this example, the PVB element 420 increases in thickness vertically toward a roof of the vehicle 100. More specifically, a lower portion of the PVB element 420 includes a first thickness 608 and an upper portion of the PVB element includes a second thickness 612 that is greater than the first thickness 608. The light 428 from the reflector 324 creates the virtual image of the combination ghost/virtual image 604.

Figure 7:
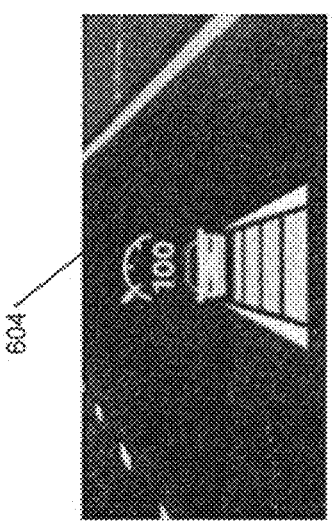
FIG. 7 includes an example illustration of including an example of the combination ghost/virtual image having ghost and virtual images that are visually aligned.
Figure 10:
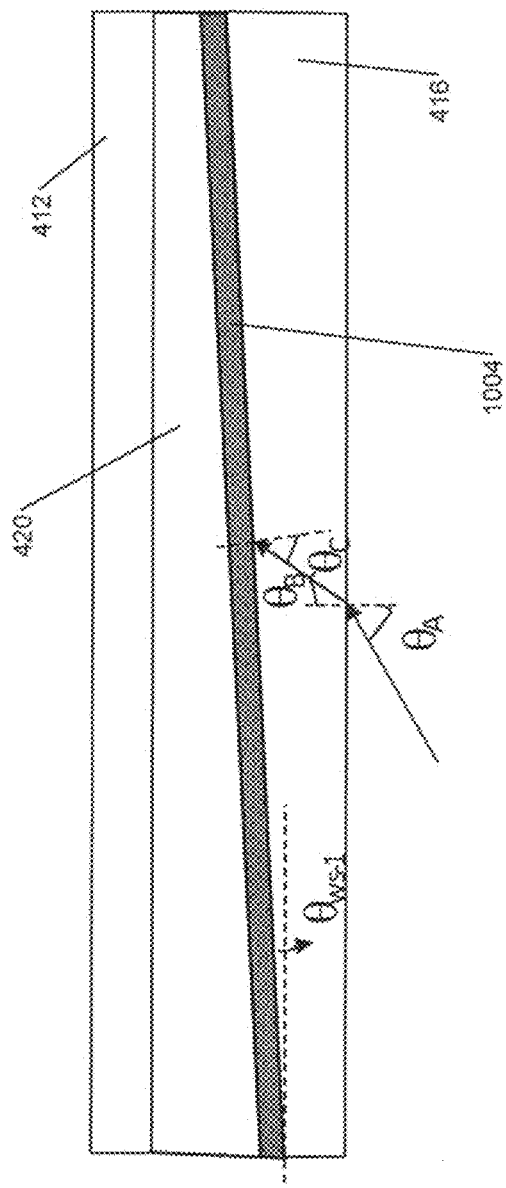

Some of the light 428, however, travels through the second glass element 416. The PVB layer 420 reflects some of the received light back toward the second glass element 416, thereby creating the ghost image of the combination ghost/virtual image 604. FIG. 7 includes an example illustration of including an example of the combination ghost/virtual image 604 having ghost and virtual images that are visually aligned.

FIGS. 8, 9, 10, and 12 include cross-sectional views of an example implementation of the windshield 104 that minimizes or prevents ghost image production. This is in contrast to the example windshields of FIGS. 4 and 6.

The windshield 104 includes the first glass element 412 and the second glass element 416. In the examples of FIGS. 8 and 9, the windshield 104 includes a light absorptive element 804 that includes PVB and that is doped with one or more light absorptive dyes that absorb the light output by the image source 304. For example, the light absorptive element 804 may include PVB resin and one or more absorptive dyes that are configured to absorb dominant (primary) wavelengths of light output by the image source 304 and that are transmissive of light within other visible wavelength ranges.

As stated above, the image source 304 may include one or more lasers and output red light, green light, and blue light. The image source 304 may output red light within a predetermined red wavelength range. The image source may output green light within a predetermined green wavelength range. The image source 304 may output blue light within a predetermined blue wavelength range. The predetermined blue wavelength range may be, for example, approximately 450 nanometers (nm)+/−10 nm or another suitable blue wavelength range. The predetermined green wavelength range may be approximately 520 nm+/−10 nm or another suitable green wavelength range. The predetermined red wavelength range may be approximately 640 nm+/−10 nm or another suitable red wavelength range.

In the example of the image source outputting red, green, and blue light, the light absorptive element 804 includes a red absorptive dye that has less than a predetermined transmittance within a second predetermined red wavelength range, a green absorptive dye that has less than the predetermined transmittance within a second predetermined green wavelength range, and a blue absorptive dye that has less than the predetermined transmittance within a second predetermined blue wavelength range. The predetermined transmittance may be, for example, 10%, 15%, or another suitable predetermined transmittance. Ghost image production may be decreased as the predetermined transmittance of the light absorptive dye decreases. The red absorptive dye that has greater than the predetermined transmittance outside of the second predetermined red wavelength range, the green absorptive dye that has greater than the predetermined transmittance outside of the second predetermined green wavelength range, and the blue absorptive dye that has greater than the predetermined transmittance outside of the second predetermined blue wavelength range.

The second predetermined red wavelength range includes the predetermined red wavelength range and may be wider than the predetermined red wavelength range. For example, the second predetermined red wavelength range may be 640 nm+/−10 nm or 15 nm or another suitable red wavelength range that is greater than or equal to the predetermined red wavelength range. The second predetermined green wavelength range may be 520 nm+/−10 nm or 15 nm or another suitable green wavelength range that is greater than or equal to the predetermined green wavelength range. The second predetermined blue wavelength range may be 450 nm+/−10 nm or 15 nm or another suitable blue wavelength range that is greater than or equal to the predetermined blue wavelength range. The second predetermined wavelength ranges may be wider than the respective predetermined wavelength ranges by a predetermined amount, such as 6 nm (+/−3 nm), 10 nm (+/−5 nm), or another suitable amount.

As shown in FIG. 8, the light absorptive element 804 may have a uniform thickness 808. As shown in FIG. 9, the light absorptive element 804 may have a variable thickness, such as increase in thickness vertically. More specifically, a lower portion of the light absorptive element 804 includes a first thickness 904 and an upper portion of the light absorptive element 804 includes a second thickness 908 that is greater than the first thickness 904. The light absorptive element 804 (and more specifically the light absorptive dye(s)) absorbs light output by the image source 304, thereby minimizing or preventing ghost image production. The light absorptive element 804 is also transmissive of light outside of the wavelengths of the light output by the image source 304.

Figure 11:
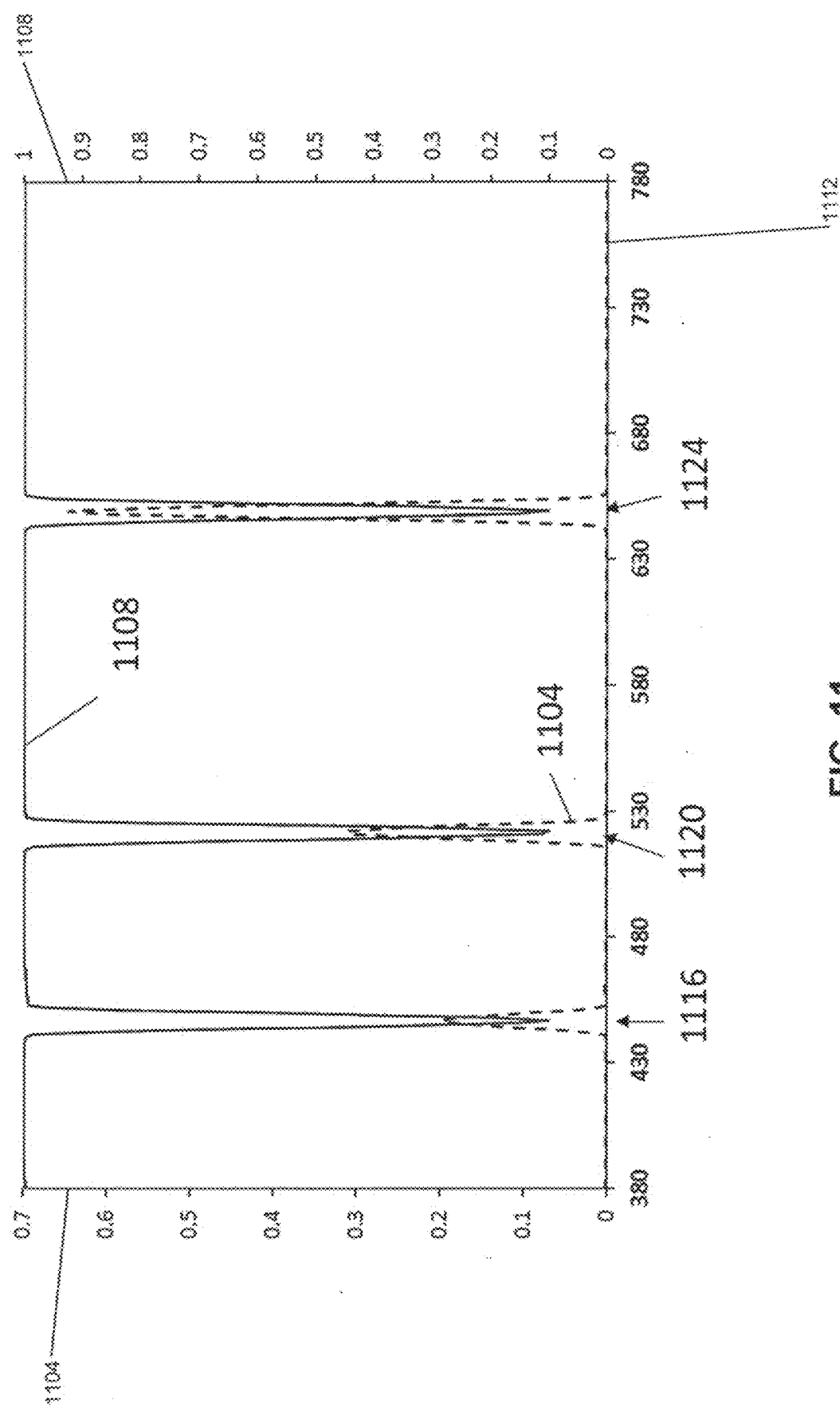
FIG. 11 includes an example graph of intensity of light output by an image source and transmittance of absorptive dyes as a function of light wavelength.

FIG. 11 includes an example graph of spectral radiance 1104 of light output by the image source 304 and transmittance 1108 of absorptive dyes as a function of light wavelength 1112. Intensities of blue, green, and red light output by the image source 304 are illustrated by 1116, 1120, and 1124, respectively. As illustrated, the red, green, and blue light absorptive dyes absorb the light output by the image source 304.

Referring back to FIG. 10, as an alternative to the light absorptive element 804 including the absorptive dye(s), the windshield 104 may include the PVB element 420 and a total internal reflection (TIR) element 1004. The TIR element 1004 may be located between the PVB element 420 and the second glass element 416.

The TIR element 1004 has a refractive index ($n_x$) that is less than a refractive index of the second glass element 416 ($n_g$). For example only, the refractive index of the second glass element 416 ($n_g$) may be equal to or approximately equal to 1.5, and the TIR element 1004 may have a refractive index ($n_x$) that is less than 1.5. The refractive index of the PVB element 420 may be, for example, approximately 1.485.

The shape of the second glass element 416 may be designed based on an induced critical angle condition. The refracted light entering the first glass element 412/air interface is reduced due to the TIR at the interface of the second glass element 416 and the TIR element 1004. The TIR element 1004 may be, for example, a laminate (e.g., one or more layers) of an aerogel (e.g., a silica aerogel) having a refractive index that is less than the refractive index of the second glass element 416.

For example, based on an incident angle (8A) of the light from the image source 304 of 45-75 degrees, refracted angle (8B) will be 28-39 degrees. Incident angle (8c) at the interface between the TIR element 1004 and the second glass element 416 will be $\theta_B+\theta_{ws-1}$ TIR at the interface between the second glass element 416 and the TIR element 1004 occurs when $\theta_C=\theta_B+\theta_{ws-1}>\sin^{-1}(n_x/n_g)$, where $n_x$ is the refractive index of the TIR element 1004, $n_g$ is the refractive index of the first and second glass elements 412 and 416, and sin is the sine function. As an example, if $n_x$ is equal to 1.3, the TIR critical angle corresponds to approximately 59 degrees, and $\theta_{ws-1}$ is greater than 31 degrees.

Figure 12:
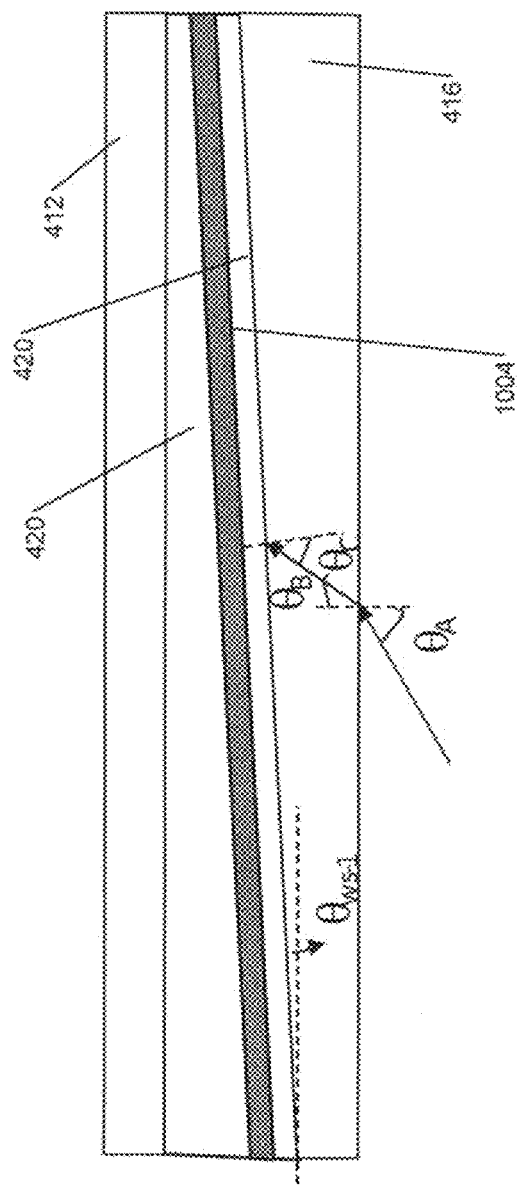
FIG. 12 includes a cross-sectional view of an example implementation of a windshield that minimizes or prevents ghost image production.

In various implementations, the TIR element 1004 may be within the PVB element 420. For example, the PVB element 420 may include two separate PVB elements 420, and the TIR element 1004 may be sandwiched between the two separate PVB elements 420, such as illustrated in FIG. 12. The TIR element 1004 may have a uniform thickness or a variable thickness. The first glass element 416 and the second glass element 412 can have a uniform thickness. The refractive index of the TIR element 1004 and the thickness can vary, but are selected together as to create a TIR condition.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

What is claimed is:

1. A system comprising:
   an image source configured to output:
   red light within a predetermined red wavelength range;
   green light within a predetermined green wavelength range; and
   blue light within a predetermined blue wavelength range; and
   a substrate including:
   a first glass element;
   a second glass element; and
   a light absorptive element that is disposed directly between the second glass element and the first glass element, that is configured to receive and absorb light output by the image source, wherein the light absorptive element includes:
      a red light absorptive dye having a first transmittance of less than a predetermined transmittance throughout the predetermined red wavelength range;

a green light absorptive dye having a second transmittance of less than the predetermined transmittance throughout the predetermined green wavelength range; and
  a blue light absorptive dye having a third transmittance of less than the predetermined transmittance throughout the predetermined blue wavelength range.

2. The substrate of claim 1 wherein the predetermined transmittance is less than 15 percent.

3. The substrate of claim 1 wherein:
  the red light absorptive dye has a fourth transmittance that is greater than the predetermined transmittance outside of the predetermined red wavelength range;
  the green light absorptive dye has a fifth transmittance that is greater than the predetermined transmittance outside of the predetermined green wavelength range; and
  the blue light absorptive dye has a sixth transmittance that is greater than the predetermined transmittance outside of the predetermined blue wavelength range.

4. The substrate of claim 1 wherein the light absorptive element includes polyvinyl butyral (PVB) resin mixed with the red, green, and blue light absorptive dyes.

5. The substrate of claim 1 wherein the light absorptive element has a uniform thickness.

6. The substrate of claim 1 wherein:
  a first portion of the light absorptive element has a first thickness between first and second glass elements; and
  a second portion of the light absorptive element has a second thickness between the first and second glass elements; and
  the first thickness is less than the second thickness.

7. The system of claim 1, wherein the system is a head up display (HUD) system of a vehicle and the substrate is a windshield.

8. The HUD system of claim 7 further comprising a reflector configured to reflect the light output by the image source onto the windshield.

9. The HUD system of claim 7 further comprising a HUD control module configured to generate signals based on vehicle data,
  wherein the vehicle data includes at least one present operating parameter of the vehicle, and
  wherein the image source is configured to output light based on the signals.

10. A system, comprising:
  an image source configured to output:
    red light within a predetermined red wavelength range;
    green light within a predetermined green wavelength range; and
    blue light within a predetermined blue wavelength range; and
  a substrate including:
    a first glass element;
    a second glass element having a first refractive index;
    a polyvinyl butyral (PVB) element disposed between the first glass element and the second glass element and directly contacting the first glass element; and
    a total internal refraction (TIR) element that is disposed between the first glass element and the second glass element, that is configured to receive light output by the image source, and that has a second refractive index,
  wherein the second refractive index is less than the first refractive index, and
  wherein the TIR element includes an aerogel.

11. The substrate of claim 10 wherein the TIR element and the second glass element are configured to reflect the light received by the TIR element back and forth between the TIR element and the second glass element.

12. The substrate of claim 10 wherein the TIR element is disposed within the PVB element.

13. A system of a vehicle, comprising:
  an image source configured to output:
    red light within a predetermined red wavelength range;
    green light within a predetermined green wavelength range; and
    blue light within a predetermined blue wavelength range; and
  a windshield including:
    an outer glass element configured to face an exterior of the vehicle;
    an inner glass element configured to face a passenger cabin of the vehicle; and
    a light absorptive element that is disposed directly between the outer glass element and the inner glass element, that is configured to receive light output by an image source of a head up display (HUD) system, and that includes:
    polyvinyl butyral (PVB);
    a light absorptive element that is disposed directly between the inner glass element and the outer first glass element, that is configured to receive and absorb light output by the image source, wherein the light absorptive element includes:
    a red light absorptive dye having a first transmittance of less than a predetermined transmittance throughout the predetermined red wavelength range;
    a green light absorptive dye having a second transmittance of less than the predetermined transmittance throughout the predetermined green wavelength range; and
    a blue light absorptive dye having a third transmittance of less than the predetermined transmittance throughout the predetermined blue wavelength range.

* * * * *